(12) United States Patent
Berry et al.

(10) Patent No.: US 12,139,586 B2
(45) Date of Patent: Nov. 12, 2024

(54) DISPERSION OF CELLULOSE NANOCRYSTALS (CNCs) IN MONOETHYLENE GLYCOL AND PROCESS OF PREPARING SAME

(71) Applicant: Celluforce Inc., Montréal (CA)

(72) Inventors: Richard Berry, Montréal (CA); Sassan Hojabr, Montréal (CA); Philippe Bourassa, Montréal (CA)

(73) Assignee: CELLUFORCE, Montreal (CA)

( * ) Notice: Subject to any disclaimer, the term of this patent is extended or adjusted under 35 U.S.C. 154(b) by 359 days.

(21) Appl. No.: 17/045,046

(22) PCT Filed: Feb. 24, 2020

(86) PCT No.: PCT/CA2020/050231
§ 371 (c)(1),
(2) Date: Oct. 2, 2020

(87) PCT Pub. No.: WO2020/172738
PCT Pub. Date: Sep. 3, 2020

(65) Prior Publication Data
US 2021/0380766 A1 Dec. 9, 2021

Related U.S. Application Data

(60) Provisional application No. 62/810,446, filed on Feb. 26, 2019.

(51) Int. Cl.
| | | |
|---|---|---|
| C08J 3/09 | (2006.01) | |
| C08G 18/32 | (2006.01) | |
| C08G 18/64 | (2006.01) | |
| C08G 63/16 | (2006.01) | |
| C08L 1/04 | (2006.01) | |

(52) U.S. Cl.
CPC .......... *C08J 3/095* (2013.01); *C08G 18/3206* (2013.01); *C08G 18/6484* (2013.01); *C08G 63/16* (2013.01); *C08L 1/04* (2013.01); *C08J 2301/02* (2013.01)

(58) Field of Classification Search
None
See application file for complete search history.

(56) References Cited

U.S. PATENT DOCUMENTS

| | | | | |
|---|---|---|---|---|
| 4,992,176 A | * | 2/1991 | Bartels | B01D 71/44 210/500.37 |
| 5,629,055 A | * | 5/1997 | Revol | C09D 5/36 428/326 |
| 2012/0244357 A1 | * | 9/2012 | Leung | C08B 15/08 977/773 |

FOREIGN PATENT DOCUMENTS

| | | | |
|---|---|---|---|
| WO | WO-2017051030 A1 | * 3/2017 | ............ B01D 1/18 |
| WO | 2018209435 A1 | 11/2018 | |

OTHER PUBLICATIONS

Isolation of Thermally Stable Cellulose Nanocrystal by Phosphoric Acid Hydroylsis, Biomacromolecules 2013, 1223-1230, Espinosa et al. (Year: 2013).*
TEMPO—mediated surface oxidation of cellulose whiskers, Cellulose 2006, 13: 679-687, Habibi et al. (Year: 2006).*
Chang, et al.; "Individually Dispersed Wood-Based Cellulose Nanocrystals"; ACS Applied Materials & Interfaces, vol. 8, Issue No. 9; 2016; pp. 5768-5771.
Espinosa, S. et al.; "Isolation of Thermally Stable Cellulose Nanocrystals by Phosphoric Acid Hydrolysis"; ACS Biomacromolecules, vol. 14, Issue No. 4; 2013; pp. 1223-1230.
Going et al.; "Cellulose Nanocrystals: Dispersion in Co-Solvent Systems and Effects on Electrospun Polyvinylpyrrolidone Fiber Mats"; Journal of Engineered Fibers and Fabrics, vol. 10, Issue No. 3; 2015; pp. 155-163.
Habibi, Y. et al.; "TEMPO-mediated surface oxidation of cellulose whiskers"; Cellulose, vol. 13; 2006; pp. 679-687.
International Search Report and Written Opinion for International Application PCT/CA2020/050231; International Filing Date: Feb. 24, 2020; Date of Mailing: Jun. 19, 2020; 9 pages.
Jiang, F. et al.; "Acid-Catalyzed and Solvolytic Desulfation of H2SO4-Hydrolyzed Cellulose Nanocrystals"; Langmuire: The ACS Journal of Surfaces and Colloids, vol. 26, Issue No. 23; 2010; pp. 17919-17925.
Lewis, L. et al.; "Hydrothermal Gelation of Aqueous Cellulose Nanocrystal Suspensions"; ACS Biomacromolecules, vol. 17, Issue No. 8; 2016; pp. 2747-2754.
Okita, et al.; "TEMPO-Oxidized Cellulose Nanofibrils Dispersed in Organic Solvents"; Biomacromolecules, vol. 12, Issue No. 2; 2011; pp. 518-522.
Viet et al.; "Dispersion of cellulose nanocrystals in polar organic solvents"; Cellulose, vol. 14; 2007; pp. 109-113.

* cited by examiner

*Primary Examiner* — Peter A Salamon

(74) *Attorney, Agent, or Firm* — CANTOR COLBURN LLP

(57) ABSTRACT

The disclosure provides a nanodispersion of cellulose nanocrystals (CNCs) in monoethylene glycol (MEG) as well as a method for dispersing CNCs in MEG and a process for preparing a polymer composites comprising a CNC nanodispersion in MEG comprising copolymerizing said nanodispersion of CNCs and at least one monomer polymerizable with said MEG and/or CNCs.

8 Claims, No Drawings

DISPERSION OF CELLULOSE NANOCRYSTALS (CNCs) IN MONOETHYLENE GLYCOL AND PROCESS OF PREPARING SAME

CROSS REFERENCE TO RELATED APPLICATIONS

This application is a National Stage application of PCT/CA2020/050231, filed Feb. 20, 2020, which claims the benefit of U.S. Provisional Application No. 62/810,446, filed Feb. 26, 2019, both of which are incorporated by reference in their entirety herein.

FIELD OF THE DISCLOSURE

The present disclosure relates to a method for dispersing cellulose nanocrystals (CNCs) in monoethylene glycol (MEG), a dispersion of CNCs in MEG, and a process for preparing a polymer composite comprising a dispersion of CNCs in MEG.

BACKGROUND OF THE DISCLOSURE

Cellulose, the most abundant of natural polymers, comprises crystalline and amorphous segments. Cellulose NanoCrystals (CNCs) can be extracted from the crystalline segment. These nanocrystals have some remarkable properties including outstanding mechanical strength. The expression of these properties in other media depends on achieving their nano-dispersion within those media.

The most common chemical process to extract CNCs uses sulfuric acid hydrolysis which results in sulfate groups on the surface of CNCs. The resultant dispersion of CNCs in aqueous media is acidic and can be neutralized with various bases. Sodium hydroxide is commonly used for the neutralization process. The most cost-efficient way to use CNC is as a dry powder. Neutralization of CNCs reduces the hydrogen bonding amongst CNCs, hence allowing for re-dispersion of CNC agglomerates in high dielectric media such as water.

The incorporation of unmodified CNCs into hydrophobic media such as most organic solvents and polymers is challenging. This difficulty is due primarily to the very low dielectric constant of most of these media, and in the case of polymers, their typically high viscosity. These conditions do not easily allow a nano-dispersion and result in only a crude distribution of aggregates of CNC particles. The presence of such aggregates in a polymer matrix represents a "defect" which instead of enhancing strength actually contributes to loss of mechanical properties of the CNC-polymer composite.

There is a need to provide stable CNC dispersions in non-aqueous solvents. These would allow for incorporating CNCs in polymers. There is a further need for methods for preparing CNC dispersions in non-aqueous solvents, at an industrial scale with commercially acceptable production costs, without requiring complex chemical reactions, or the use of hazardous organic solvents involving multiple steps.

SUMMARY OF THE DISCLOSURE

An aspect relates to a method for dispersing cellulose nanocrystals (CNCs) in monoethylene glycol (MEG) comprising:
  mixing solid CNCs and MEG; and
  applying mechanical energy to cause dispersion of said CNCs in MEG;
  and wherein said dispersion is comprising CNCs having a nanometric dimension as measured by dynamic light scattering (DLS).

An aspect relates to a dispersion of cellulose nanocrystals (CNCs), wherein said dispersion is in monoethylene glycol (MEG), and is comprising said CNCs having a nanometric dimension as measured by dynamic light scattering (DLS).

A further aspect relates to a process for preparing a polymer composite comprising:
  dispersing cellulose nanocrystals (CNCs) in monoethylene glycol (MEG) to provide a nanometric dispersion of said CNCs in said MEG;
  copolymerizing said nanometric dispersion of CNCs and at least one monomer polymerizable with said MEG.

DETAILED DISCLOSURE

The inventors have now found that CNCs without surface modification can be dispersed in monoethylene glycol (MEG) with the application of mechanical energy alone. Using, for example, sonication, it has been possible to disperse CNCs in MEG obtaining a stable nano-metric CNC dispersion. The importance of this finding is that MEG can be used as a non-aqueous solvent but also that it is a precursor to certain condensation polymers. The inclusion of nano-dispersed CNCs within MEG allows a pathway to obtain nano-dispersion in a water-free medium and in certain industrial polymers.

MEG

In the disclosure, MEG means monoethylene glycol and is a non-aqueous solvent.

CNCs

As used herein, "acidic CNCs" refers to CNCs having neutralizable acidic protons (i.e. on sulfonic, phosphonic, carboxylic groups or mixtures thereof) present on the surface of the nanocrystals.

The acidic CNCs that may be used can be purchased or obtained from various approaches using controlled hydrolysis with a strong mineral acid. The use of sulfuric acid causes partial esterification of some of the primary hydroxyl groups on the exposed cellulose leaving a sulfate half-ester group ($—OSO_3H$) which retains a single negative charge at the nanocrystal surface (J.-F. Revol et al. U.S. Pat. No. 5,629,055).

The surface charge can be reduced by desulfation (DS) in a post-treatment after sulfuric acid hydrolysis (F. Jiang, et al. Langmuir, vol. 26, pp. 17919-17925, 2010).

Phosphoric acid can also be used to produce cellulose nanocrystals with similar suspension properties through the introduction of phosphate half-esters ($—OPO_3H$) (S. C. Espinosa, et al. Biomacromolecules, vol. 14, p. 1223-1230, 2013).

It is also possible to extract cellulose nanocrystals by oxidation from biomass such as wood pulp. Such oxidation processes generate carboxylic acids ($—COOH$) on the surface of the nanocrystals. Persulfate salts can be used to generate a carboxylated form of charged cellulose nanocrystals (C. Woon Leung, et al. US 2012/0244357) as can hydrogen peroxide in an acidic environment (B. G. Refineries, November 2016 «The R3™ Technology Renewable,»:

http://bluegoosebiorefineries.com/our-technology/). Both methods lead to carboxylated cellulose nanocrystals.

Sulfuric acid extracted cellulose nanocrystals can be further oxidized, for example by using the catalytic TEMPO/NaOCl/NaBr system (Y. Habibi, et al. Cellulose, vol. 13, pp. 679-687, 2006). This method leaves the sulfate-half ester group intact giving a surface bearing both sulfate-half esters and carboxylic acids.

The cellulose nanocrystals may be dispersed in MEG after neutralization of the extracted CNCs and/or after desulfation or oxidation.

In one embodiment, said CNCs are comprising sulfate half-esters (unmodified or desulfated), carboxylic acids or mixtures thereof.

Concentration

The CNCs can be mixed with MEG at a concentration of from at least 0.1 w/v %. Under ultrasonication, amounts may be up to about 12 w/v %. The concentration may be different when using other dispersion techniques.

Mechanical Energy

The mechanical energy that can be used to provide a dispersion as disclosed herein include ultra-sonication. The amount of required energy for sonication is very dependent on the volume of the fluid treated. The useful sonication energy may be ≤20 kJ/g however the skilled person can assess (e.g. by DLS) whether the sonication has been performed at a required intensity/sufficient time. Other mechanical energy sources include industrially amenable homogenizers and fluidizers both of which can be adjusted to provide a given energy per gram of material at a given concentration and flow rate.

Particle Size

The particle size of dispersed CNCs, as measured by DLS, herein is preferably smaller than 1000 nm, more preferably the size is smaller than 500 nm, or less than 250 nm and most preferably less than 100 nm.

Application In Polymers

In polymer systems, it is critical to achieve a percolation network which in this context is the uniform distribution of a nanoparticle at a concentration where the particle elements are numerous enough to interact with one another. A percolation network by itself may increase the polymer stiffness (tensile modulus) and strength (ultimate tensile strength), but there may be an associated significant loss of polymer stretchability (elongation at break). This results in a brittle polymer with low toughness which has limited industrial benefits. The shortfall in polymer stretchability can be overcome if there are interactions between the particle elements and the polymer medium. These interactions allow a more integrated network at a much lower concentration of nano particles. One approach to achieve this integrated network is to use in situ polymerization.

The addition of a small amount of CNCs into the polymerization process can change the properties of the resulting polymer.

The nanodispersion of CNCs into MEG ($\varepsilon$=37) is contemplated to allow in-situ polymerization with polymers, where MEG is used as a monomer. In-situ polymerization in the presence of CNCs may also allow its integration in the polymer chain due to reactivity of primary hydroxyl groups present on the CNCs.

For example, the co-monomers polymerizable with MEG include those having two carboxylic acids on the same monomer, thereby allowing the preparation of polyesters. The nanodispersion may also be used as precursors for reaction with isocyanates to make polyurethanes.

Example 1: Preparation of CNC Dispersions in Neat Monoethylene Glycol (MEG)

Unmodified spray-dried cellulose nanocrystals can be directly redispersed in MEG by means of ultra-sonication. Sodium hydroxide-neutralized sulfuric acid extracted CNC samples were obtained from CelluForce (under tradename CelluForce NCC NCV-100). 500 mg of dried cellulose nanocrystals is placed in 10 mL of MEG (Sigma-Aldrich) for a concentration of 5 w/v %. Different levels of ultra-sonication energy is then applied to the suspensions (up to 50 kJ per g of CNCs mass) using a Cole-Parmer 6 mm diameter probe sonicator (USA) until the cellulose nanocrystals are dispersed to nanometric dimensions. The particle size of the dispersed CNC particles is measured by dynamic light scattering (Malvern Zetasizer ZS) and is reported in Table 1 for sonications of 20, 30 and 50 kJ/g CNCs. The suspension quality in Table 1 was visually assessed 24 hours after the ultra-sonication.

TABLE 1

Measured particle size of cellulose nanocrystals by dynamic light scattering as a function of applied ultra-sonication energy.

| Sonication energy (kJ/g) | Particle size by DLS (d · nm) | Suspension quality |
|---|---|---|
| 0 | Could not be measured >1000 nm | No dispersion, spray-dried material settles |
| 20 | 117 | Stable dispersion, slight haze |
| 30 | 92 | Stable dispersion, slight haze |
| 50 | 91 | Stable dispersion, slight haze |

Example 2: Preparation of Tempo-Oxidized CNC Dispersions in Neat Monoethylene Glycol (MEG)

Modified cellulose nanocrystals can also be redispersed in MEG by means of ultra-sonication. In this example, sodium form neutralized sulfuric acid extracted CNC samples from CelluForce were oxidized by the TEMPO/NaOCl oxidative system, dried and redispersed in MEG. To prepare the materials a method from the literature was adapted (Y. Habibi, et al. Cellulose, vol. 13, pp. 679-687, 2006.). Briefly, 0.03 equivalents of anhydroglucose units of TEMPO catalyst was added to a 2 wt. % CNC suspension. Sodium bromide is then added to the mixture as co-catalyst in amounts of 0.25 molar equivalents or anhydroglucose units until full dissolution. After, a dilute solution of sodium hypochlorite containing 0.4 eq. is slowly added to the suspension while stirring vigourously. The pH is the suspension is maintained at 10 with the addition of a sodium hydroxide solution. The reaction carried out for an hour, after which the reaction mixture is purified by dialysis using 10 kDa membranes. After purification, the suspension is acidified using a cation exchange resin. The protonated CNC particles are then converted to the sodium salt form using sodium hydroxide and freeze-dried. The dried material is redispersed in MEG by placing 100 mg of dried material in 10 mL of liquid followed by ultra-sonication. The particle size is measured by DLS and the suspension quality after 24 hours is reported in table 2.

TABLE 2

Measured particle size of tempo-oxidized cellulose nanocrystals by dynamic light scattering

| Sonication energy (kJ/g) | Particle size by DLS (d · nm) | Suspension quality |
|---|---|---|
| 50 | 75 | Stable dispersion, clear |

Example 3: Preparation of Partially Desulfated CNC Dispersions in Neat Monoethylene Glycol Desulfated CNCs were produced using an adapted method from the literature (L. Lewis, et al. Biomacromolecules, vol. 17, pp. 2747-2754, 2016). Briefly, the sulfate-half esters on the surface of CNCs are hydrolyzed under hydrothermal conditions at a pH of 2.3. The suspension was heated at 150° C. for 30 minutes in a closed stainless steel vessel submerged in a heat transfer fluid. After treatment, the suspension was dialyzed using 10 kDa molecular weight cutoff cellophane membranes followed by treatment with an acidic ion exchange resin. The suspension was then converted to its sodium salt form using sodium hydroxide and then freeze-dried. The freeze-dried product was dispersed in MEG at 1 w/v % using ultra-sonication and the particle size is measured by DLS and the suspension properties are reported in table 3.

TABLE 3

Measured particle size of partially desulfated CNCs

| Sonication energy (kJ/g) | Particle size by DLS (d · nm) | Suspension quality |
|---|---|---|
| 50 | 708 | Stable dispersion, turbid |

Comparative Example: Preparation of CNC Dispersions in Propylene Glycol and Diethylene Glycol Unmodified spray-dried cellulose nanocrystals were considered for redispersion in other low molecular weight polyol liquids, propylene glycol and diethylene glycol. The dispersions were prepared by placing 100 mg of spray-dried material in 10 mL of liquid follow by ultra-sonication. After the treatment, we do not observe nano-scaled dispersions of CNC particles. The suspension properties are reported in table 4.

TABLE 4

Comparative measured CNCs particle size in PPG and DEG

| Dispersing medium | Sonication energy (kJ/g) | Particle size by DLS (d · nm) | Suspension quality |
|---|---|---|---|
| Propylene glycol | 50 | >1000 | Unstable dispersion |
| Diethylene glycol | 50 | >1000 | Unstable dispersion |

While the present description has been described in connection with specific embodiments thereof, it will be understood that it is capable of further modifications and this application is intended to cover any variations, uses, or adaptations, including such departures from the present disclosure as come within known or customary practice within the art to and as may be applied to the essential features hereinbefore set forth, and as follows in the scope of the appended claims.

All cited references are hereby incorporated by reference in full.

The invention claimed is:

1. A method for dispersing cellulose nanocrystals (CNCs) in monoethylene glycol (MEG) comprising:
   mixing dry solid powder CNCs and monoethylene glycol (MEG); and
   applying mechanical energy to the mixture to cause dispersion of said CNCs;
   and wherein said dispersion comprises CNCs having a nanometric dimension as measured by dynamic light scattering (DLS).

2. The method of claim 1 wherein said CNCs comprise sulfate half ester groups.

3. The method of claim 1 wherein said CNCs comprise phosphate half ester groups.

4. The method of claim 1 wherein said CNCs comprise carboxylic acid groups.

5. The method of claim 1 wherein said CNCs comprise both sulfate-half ester and carboxylic acid groups.

6. The method of claim 1, wherein said mechanical energy is provided by at least one of an ultra-sonicator, a homogenizer, and a fluidizer.

7. The method of claim 1, wherein at least 0.1 w/v % of solid CNCs in MEG are mixed.

8. The method of claim 1, wherein said mixing step is by ultrasonication.

* * * * *